(12) United States Patent
Obayashi et al.

(10) Patent No.: US 6,173,574 B1
(45) Date of Patent: Jan. 16, 2001

(54) HYBRID ELECTRIC VEHICLE CONTROL APPARATUS FOR MAXIMIZING VEHICLE ENGINE OPERATING EFFICIENCY

(75) Inventors: Kazuyoshi Obayashi, Chitagun; Tsuneyuki Egami, Gamagori; Hiroya Tsuji, Yokkaichi, all of (JP)

(73) Assignee: Denso Corporation, Kariya (JP)

( * ) Notice: Under 35 U.S.C. 154(b), the term of this patent shall be extended for 0 days.

(21) Appl. No.: 09/348,011

(22) Filed: Jul. 6, 1999

(30) Foreign Application Priority Data

Jul. 7, 1998 (JP) .................................................. 10-192041

(51) Int. Cl.⁷ ...................................................... F02D 25/00
(52) U.S. Cl. ................................................. 60/710; 60/706
(58) Field of Search ................................ 60/698, 706, 710

(56) References Cited

U.S. PATENT DOCUMENTS

| | | | |
|---|---|---|---|
| 2,466,282 | * 4/1949 | Sparrow et al. | 60/710 X |
| 3,174,287 | * 3/1965 | Voitik | 60/710 X |
| 5,461,289 | 10/1995 | Adler et al. | |
| 5,771,860 | * 6/1998 | Bernardi | 60/710 X |
| 5,788,004 | 8/1998 | Friedmann | |
| 5,806,617 | 9/1998 | Yamaguchi | |
| 5,907,191 | 5/1999 | Sasaki et al. | |
| 6,018,694 | * 1/2000 | Egami et al. | |

FOREIGN PATENT DOCUMENTS

| | | |
|---|---|---|
| 4407666A1 | 3/1994 | (DE) . |
| 44 07 666 | 9/1995 | (DE) . |
| 195 05 431 | 8/1996 | (DE) . |
| 820894A2 | 1/1998 | (EP) . |
| 0 830 969 | 3/1998 | (EP) . |
| 0 856 427 | 8/1998 | (EP) . |
| 7-135701 | 5/1995 | (JP) . |
| 10-84602 | 3/1998 | (JP) . |
| 10-225058 | 8/1998 | (JP) . |

* cited by examiner

Primary Examiner—Hoang Nguyen
(74) Attorney, Agent, or Firm—Pillsbury Madison & Sutro LLP

(57) ABSTRACT

A control apparatus for a hybrid electric vehicle that minimizes vehicle fuel-consumption. A fuel consumption coefficient relating to overall efficiency of a hybrid engine is calculated. An engine operating point whereat this fuel-consumption coefficient is optimized is then determined, and the engine is controlled to operate at the determined engine operating point. When such control is performed, overall engine efficiency in all operating regions can be optimized, and further improvements in fuel consumption can be realized.

20 Claims, 6 Drawing Sheets

HYBRID ELECTRIC VEHICLE CONTROL APPARATUS FOR MAXIMIZING VEHICLE ENGINE OPERATING EFFICIENCY

CROSS-REFERENCE TO RELATED APPLICATION

The present application is related to, and claims priority from, Japanese Application No. Hei. 10-192041, the contents of which are incorporated herein by reference.

BACKGROUND OF THE INVENTION

1. Technical Field

The present invention relates to a control apparatus for a hybrid electric vehicle, and particularly to a control apparatus that maximizes vehicle operating efficiency by determining a vehicle maximum operating point for all engine operating conditions.

2. Discussion

A conventional hybrid electric vehicle includes an engine, two electric motors, and a battery (hereinafter also termed a two-motor type hybrid electric vehicle), such as is disclosed in Japanese Patent Application No. Hei. 8-239380. In such a vehicle, a controller determines a vehicle drive-power requirement value defined by vehicle speed (crank-angle speed) and vehicle required torque. An engine-power requirement value is calculated from both the sum of this value and a charge and discharge power requirement value. Also, an engine operating point whereat the engine is operable at high efficiency is determined, and throttle control is performed so that the engine operates at this point. The controller then controls engine speed via the first motor and controls excessive or insufficient torque of the vehicle via the second motor.

In the above conventional control apparatus, by increasing or decreasing vehicle torque by torque-addition exchange via the -motor pair, control (also termed engine efficiency-improvement control) is performed to reach high-efficiency engine operation while satisfying vehicle power requirements, i.e., the vehicle drive-torque requirement value at actual vehicle speed. Therefore, vehicle fuel consumption is improved.

However, regarding the above control application, fuel consumption tends to worsen during certain vehicle operating conditions, especially where the vehicle operating point is in a high-speed, low-torque region, irrespective of the above-described engine efficiency-improvement control. In response, a considerable portion of vehicle drive power must be passed through the motor of the motive-power transmitter, and torque conversion must be performed by electrical-power transformation. As a result thereof, even when the optimal engine operating point with respect to the engine-power requirement value is selected, the overall efficiency of the hybrid-system deviates from the optimal point thereof due to the losses due to the motors. That is to say, the overall efficiency of the hybrid system decreases as the conventional hybrid engine control establishing the engine operating point does not account for the motor loss.

SUMMARY OF THE INVENTION

Therefore, it is an object of the present invention to provide a control apparatus for a hybrid electric vehicle with improved fuel-consumption characteristics.

More particularly, the present invention includes a controller for controlling the relationship between information relating to overall efficiency of a hybrid-system and an engine operating point, and determines an engine operating point that maximizes overall efficiency.

As a result, overall hybrid-system operation in all running regions can be optimized by establishing the engine operating point so that overall efficiency of the hybrid vehicle system is optimized as in conventional hybrid-system control, while additionally improving fuel consumption.

The present invention performs engine control to optimize the overall efficiency of the hybrid-system, and so can achieve favorable fuel consumption even in a region where the vehicle operating point requires a large electrical-power transformation quantity.

DETAILED DESCRIPTION OF THE PRESENT INVENTION

Figure 1:
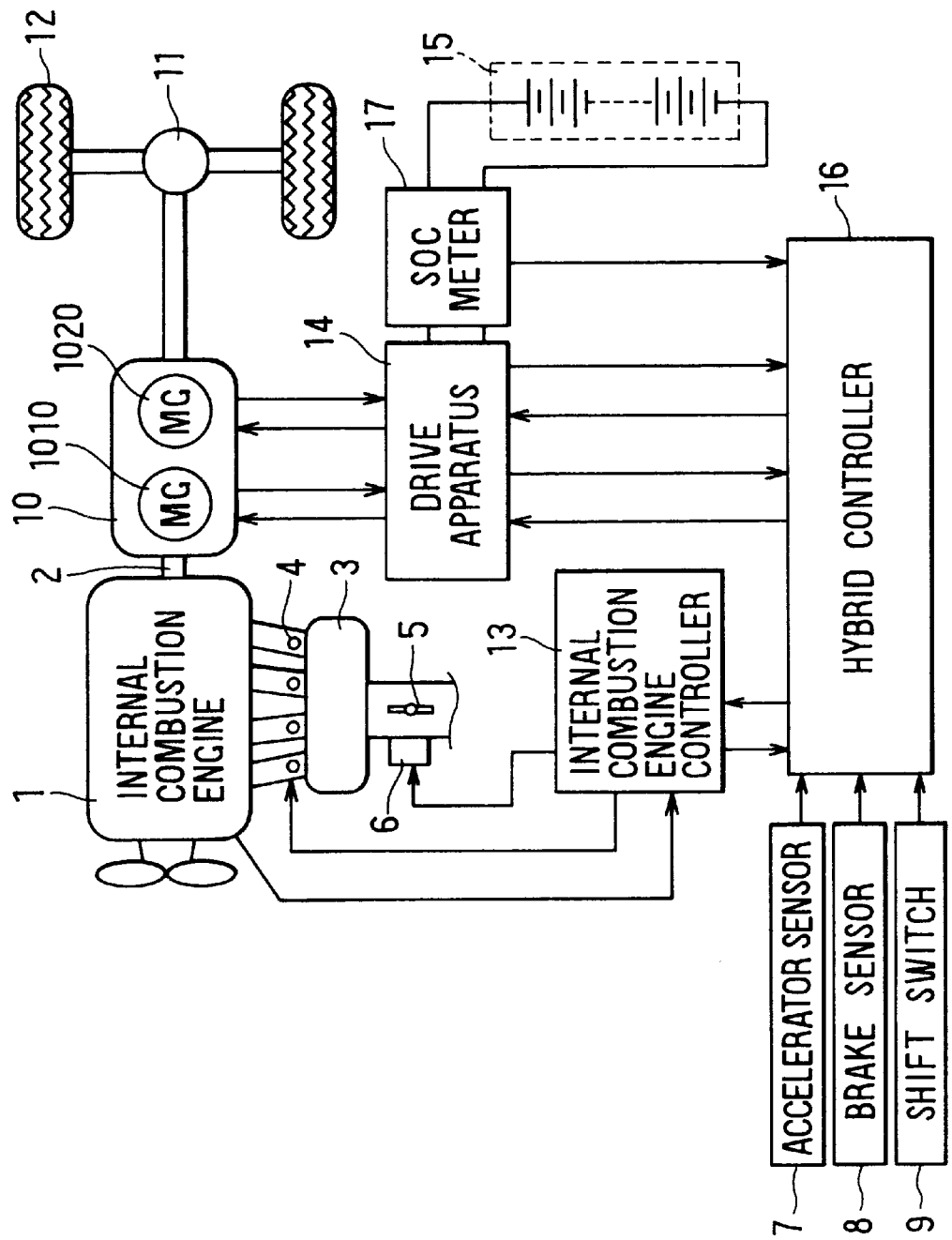
FIG. 1 is a block diagram of a control apparatus for a hybrid electric vehicle according to the present invention.

A first embodiment of a control apparatus for a hybrid electric vehicle according to the present invention will be described hereinafter with reference to FIG. 1, which is a block diagram depicting an essential portion of a drive system of the hybrid electric vehicle. The drive system includes an internal combustion engine 1, an output shaft 2 of the internal combustion engine 1, an air-intake tube 3, a fuel-injection valve 4, a throttle valve 5, an intake-air quantity regulator 6, an accelerator sensor 7, a brake sensor 8, a shift switch 9, and a motive power transmitter 10 provided with a first motor 1010 and a second motor 1020.

Also, the system includes a differential gear 11, a driveshaft 12, an internal combustion engine controller 13, a drive apparatus 14 of the first and second motors 1010, 1020, an electricity-storage apparatus 15 made up of a battery, a hybrid controller 16, and an SOC meter 17 to measure an electrically charged state of the electricity-storage apparatus.

The engine 1, the motive-power transmitter 10, and the electricity-storage apparatus 15 form a hybrid-system, while the internal combustion engine controller 13, the drive apparatus 14, the hybrid controller 16, and the SOC meter 17 form a control apparatus for a hybrid electric vehicle. The internal combustion engine controller 13 and the hybrid controller 16 incorporate a microprocessor.

The motive power transmitter 10 is provided with the two motors 1010, 1020. The first motor 1010 is provided with an inner rotor interconnected with the output shaft 2 of the internal combustion engine 1 and an outer rotor disposed on the outer peripheral side of the inner rotor. The second motor 1020 is made up of a three phase alternating current (AC) motor having a rotor provided with a permanent magnet not illustrated and a stator provided with a three-phase coil. The rotor is integrally or mechanically interconnected with the outer rotor of the first motor 1010 to rotate, and together therewith, is interconnected with the output shaft of the vehicle via the differential gear. For example, with the first and second motors 1010, 1020, it is possible also to employ a coaxially-arranged structure in which the stator of the second motor 1020 is disposed on the outer peripheral side of the outer rotor of the first motor 1010 to overlap the rotor of the second motor 1020, and in which the second motor 1020 is disposed on the outer peripheral side of the first motor 1010. Because the structure and mode of operation of the motive power transmitter 10 made up of these two two-rotor type motors is well known, further description thereof will be omitted.

Figure 5:
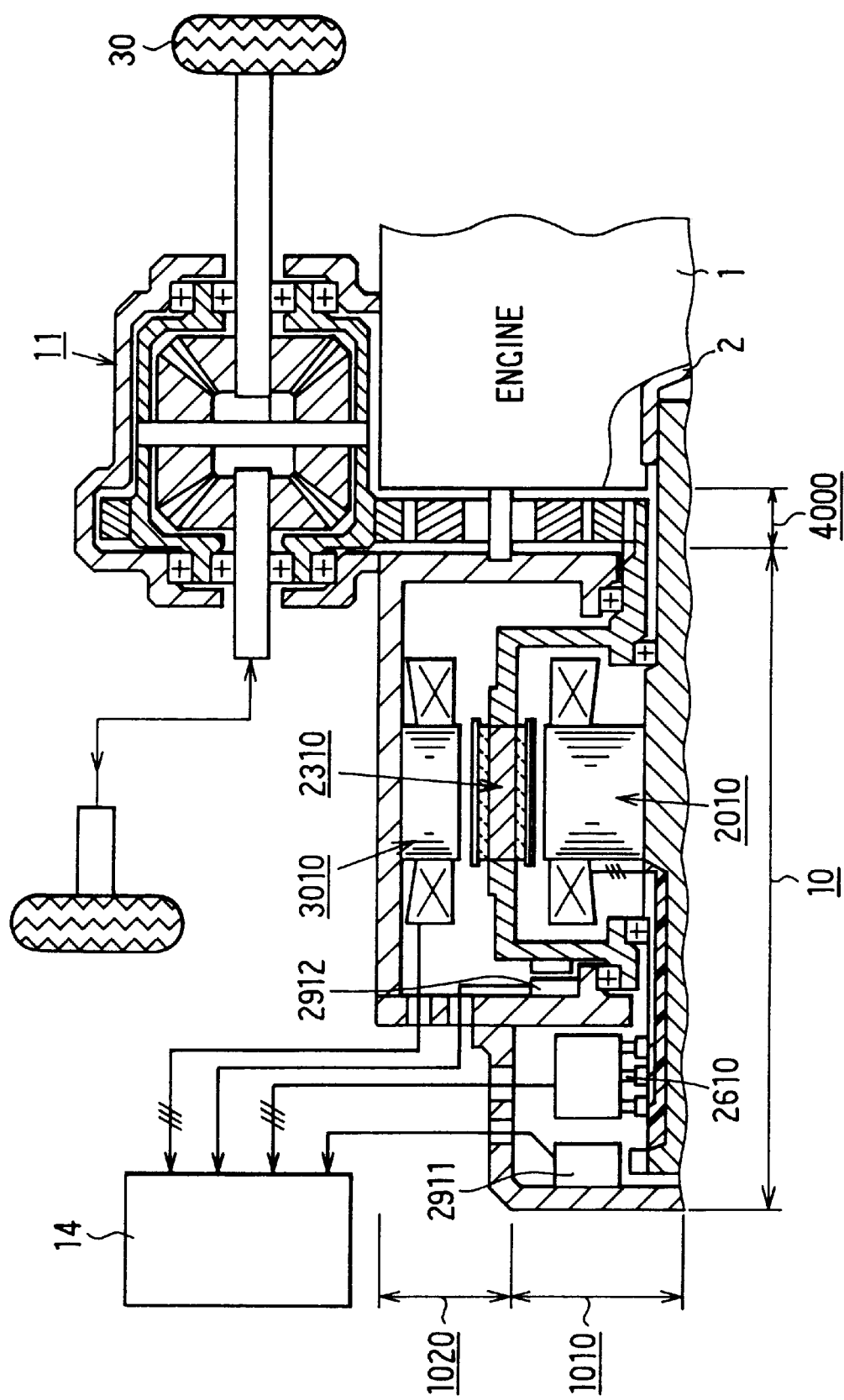
FIG. 5 is an example sectional view of the motive-power transmitter shown in FIG. 1.

An example sectional view of the motive power transmitter 10 is shown in FIG. 5. The motive power transmitter 10 is provided with two motors 1010 and 1020. The first motor 1010 includes an inner rotor 2010 interconnected with the output shaft 2 of the internal combustion engine 1, and an outer freely rotatable rotor 2310 maintained in a housing and opposing an outer peripheral surface of the inner rotor 2010. The rotor is provided with a three-phase armature coil disposed on the inner rotor 2310, and a permanent magnet disposed on the inner peripheral side of the outer rotor 2310. The foregoing three-phase armature coil is supplied with three-phase alternating-current voltage from the drive apparatus 14 via a slip ring 2610.

The second motor 1020 includes a stator 3010 fixed to an inner peripheral surface of the housing and disposed to oppose the outer peripheral surface of the outer rotor 2310. The motor 1020 is preferably a three-phase AC motor wherein a permanent magnet is disposed on the outer peripheral side of the outer rotor 2310, and a three-phase armature coil wound on the stator is supplied with three-phase alternating-current voltage from the drive apparatus 14. The outer rotor 2310 is interconnected with a differential gear 20 via a reduction-gear mechanism 4000. A rotation-position sensor 2911 detects a rotation-angle position of the inner rotor 2010, and a rotation-position sensor 2912 detects a rotation-angle position of the outer rotor 2030.

The hybrid controller 16 computes an engine-power power requirement value based on vehicle-operation information input from the accelerator sensor 7, the brake sensor 8, the shift switch 9 and vehicle speed from a vehicle-speed sensor not illustrated, and sends this requirement to the internal combustion engine controller 13.

The internal combustion engine controller 13 stores a fuel-consumption ratio map of the internal combustion engine 1, and determines, based on the received engine-power requirement value and the fuel-consumption ratio map, an engine operating point whereat the internal combustion engine 1 reaches maximum efficiency. The controller 13 then determines an intake-air quantity (engine power requirement value) and engine speed requirement value corresponding to this engine operating point.

Furthermore, the internal combustion engine controller 13 controls the throttle-valve opening degree based on the determined intake-air quantity, and sends the engine speed requirement value to the hybrid controller 16. Additionally, the controller 13 drives an electronic-control fuel-injection device mounted in the internal combustion engine 1 and executes fuel-injection control, or executes well-known ignition control.

The hybrid controller 16, in order to perform speed control of the first motor 1010 to satisfy the received engine speed requirement value, computes the torque requirement value of the first motor 1010 based on a rotation-angle speed differential of the two rotors of the first motor 1010 sent from the drive apparatus 14, and instructs the drive apparatus 14. Additionally, the hybrid controller 16 calculates the torque requirement value of the second motor 1020 from a differential between the vehicle drive-torque requirement value and the torque requirement value of the first motor 1010, and outputs this to the drive apparatus 14.

The drive apparatus 14, performs control of the field direction of the first motor 1010 and second motor 1020 and current control in a direction perpendicular thereto based on the torque requirement values of the first and second motors received from the hybrid controller 16. Such control causes torque to be generated in accordance with the torque requirement value.

Further, ordinarily the drive apparatus 14 respectively detects and sends to the hybrid controller 16 the speeds of the first and second motors 1010, 1020. At this time, one of the first and second motors 1010, 1020 generates electricity and supplies this generated electricity to the other motor, which is performing a motor operation.

A process to determine the engine operating point whereat overall efficiency is maximized will be described with reference to the torque/speed characteristic diagram of FIG. 6 as one example of the present invention.

Required vehicle operating points are vehicle drive torque Td and vehicle drive speed Nd, which are output characteristics of the output shaft of the hybrid-system. A characteristic curve indicating an engine-power/engine speed relationship equivalent to engine-power requirement value Pe' at this time is A, and B is an engine high-efficiency operation curve whereat the engine can be operated at high efficiency.

Figure 6:
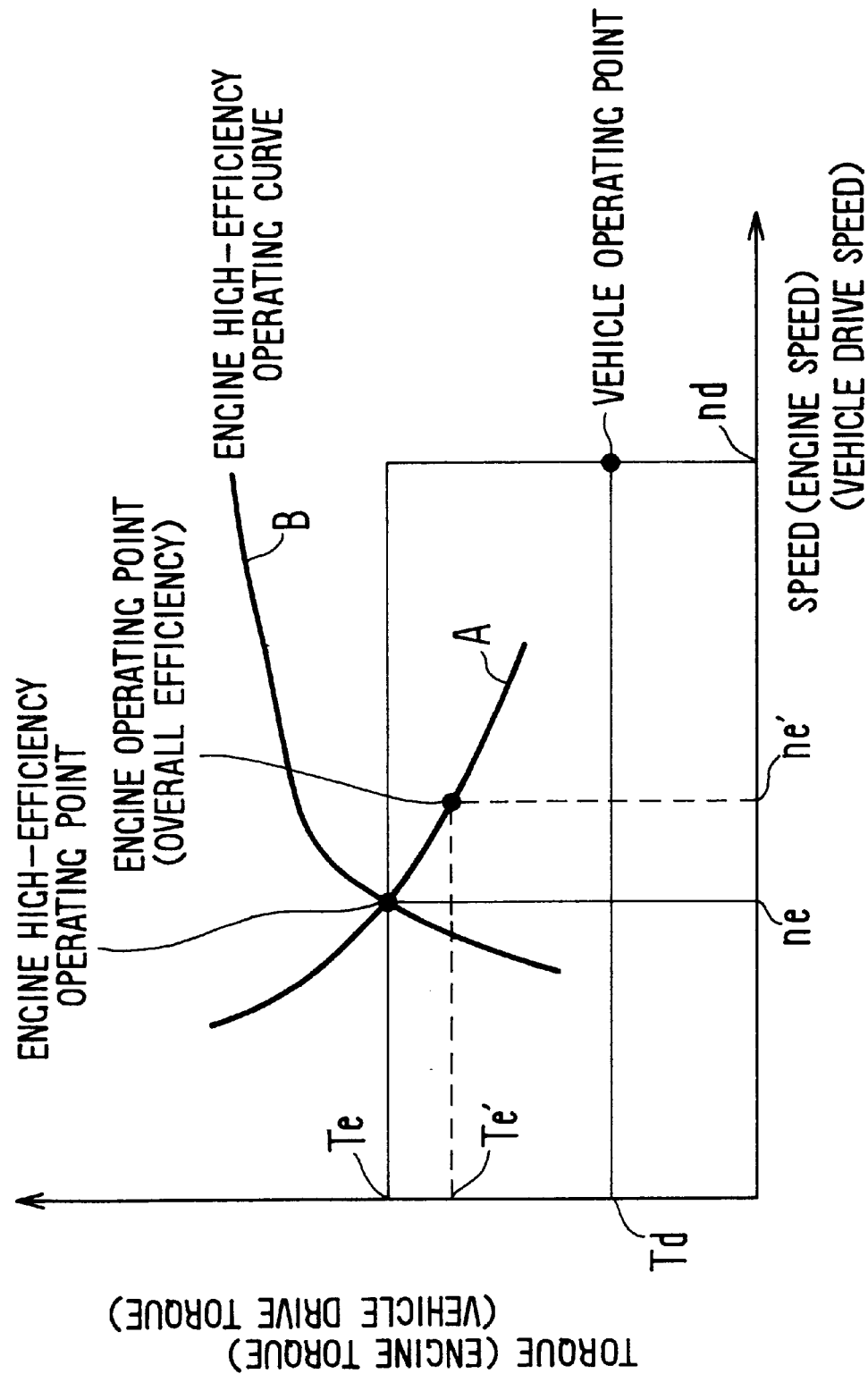
FIG. 6 is a torque/speed characteristic diagram indicating a process for determining the engine operating point whereat overall efficiency is maximized.

Consequently, originally the engine high-efficiency operating point (Te, ne) described in FIG. 6 is determined from a stored map, and engine efficiency can be maximized when the engine is run at this engine high-efficiency operating point, as is done in conventional hybrid-system control methods.

However, in this case, to convert engine power to vehicle drive power, the motive power transmitter needs to convert a portion of surplus engine drive power, namely (Te−Td)•ne, to insufficient vehicle-drive motive power, namely (nd−ne)•Td. That is to say, as the torque differential (Te−Td) and the speed differential (nd−ne') diverge, the power conversion quantity required by the motive power transmitter increases, as does the associated loss at this time.

In contrast thereto, the point whereat the overall efficiency expressed by engine torque Te' and engine speed ne' is maximized occurs on characteristic curve A, displaced slightly more toward the vehicle operating point than the above-described engine high-efficiency operating point (Te, ne).

This signifies that for the foregoing insufficient vehicle-drive motive power, it is sufficient to perform torque conversion for solely the insufficient vehicle-drive motive power termed (nd−ne')•Td. Also, the insufficient vehicle-drive motive force to undergo power conversion can be reduced by an amount equal to (ne'−ne)•Td compared with the conventional methods, and power-generation/motor loss accompanying this conversion can be reduced by an amount equal to that portion. Of course, because the shift of this engine operating point may lead to a corresponding decline in engine efficiency, the shift quantity of the engine operating point is determined by the above-described balance of loss and gain.

A hybrid engine control system forming an essential portion of the present embodiment will be described hereinafter with reference to the flow diagram depicted in FIG.

2. This flow diagram, which represents operation of the controller 16, is for determining the engine operating point whereat overall efficiency is maximized, and is executed by interruption in the hybrid controller 16 at every 4 ms during engine operation. The flow diagram indicates control operation from computation of a vehicle drive-torque requirement value Td' up through computation of respective torque requirement values Tm1' and Tm2' of the first and second motors 1010, 1020.

Initially, the vehicle drive-torque requirement value Td' is calculated based on an accelerator opening degree input from the accelerator sensor 7 (S100), and the vehicle drive-power requirement value Pd' is calculated based on vehicle speed (or output-shaft speed of the hybrid engine) V from a vehicle-speed sensor not illustrated (S102).

Additionally, the vehicle drive-power requirement value Pd' is calculated by Td'•V. Next, a charge and discharge electrical power requirement value Pb' is calculated based on the output value from the SOC meter 17 (S103), and together therewith, the charge and discharge electrical power Pb is acquired from the SOC meter 17 (S104). Accordingly, an engine-power requirement value Pe' is calculated from the following equation: Pe'=Pd'+Pb'.

Next, the engine operating point :Ls determined (S106). This control is an essential portion of this embodiment, and so will be described in detail with reference to the flow diagram depicted in FIG. 3.

At S200, investigation as to whether the vehicle is determined to be in a steady cruising state (the vehicle speed, the torque requirement value, the engine speed, and so on are substantially uniform) is performed. When a steady cruising state is not detected, the control then returns to a main routine not illustrated. Further, the engine operating-point shift ratio a referred to herein expresses a shift quantity from a predetermined engine operating-point initial value, and will be described in detail later.

When in a steady cruising state, determination of an engine operating-point shift permission state is made, a value of a counter cnt to count is acquired each 200 msec, and investigation is performed as to whether the count has exceeded 50 (S201). When the value of this counter cnt exceeds 50, at S203 the counter cnt is reset, and execution advances to S204. When 50 is not exceeded, at S224 the value of this counter cnt is incremented, and execution advances to S213.

At S204, a fuel-consumption quantity M per unit time is acquired (S206), and a fuel-consumption coefficient me corresponding to the overall efficiency in terms of the present invention is calculated (S208).

This fuel-consumption coefficient me will be described hereinafter. Efficiency of the hybrid-system is regarded as the product of engine efficiency and the efficiency of the motive power transmitter. When the motor of the hybrid-system charges the battery, efficiency ηt of the motive power transmitter can be regarded as the ratio with the sum of the engine power Pe which is the input energy, and vehicle drive power Pd and charge and discharge electrical power Pb which are the output energy. When the vehicle drive-power requirement value Pd' is substituted for the vehicle drive power Pd, ηt=(Pb+Pd')/Pe is obtained.

Meanwhile, the fuel-consumption quantity M can be regarded as the proportion to the product of engine efficiency ηe and the engine power Pe, and when c is caused to be a proportional constant, can be indicated by the following equation.

ηe=c•Pe/M and so the efficiency η of the hybrid-system yields

η=ηt•ηe

=((Pb +Pd')/Pe)•(c•Pe/M)

=c•(Pb+Pd')/M.

That is to say, the overall efficiency of the hybrid system can be calculated from the fuel-consumption quantity M or a parameter that can be regarded as being interlocked therewith, the charge and discharge electrical power Pb or a parameter that can be regarded as being interlocked therewith, and the vehicle drive power Pd or a parameter that can be regarded as being interlocked therewith.

Next, when the fuel-consumption coefficient me presently calculated (the present value me) is improved from the previous value meo by a predetermined value ΔM or more, the engine operating-point shift ratio α is shifted by a predetermined value Δm in the identical direction as the previous shift direction (S210). When the present value me has declined from the previous value meo by the predetermined value Δm or more, the engine operating-point shift ratio α is shifted by the predetermined value Δm in the opposite direction of the previous shift direction (S212). When the absolute value of the differential between the present value me and the previous value meo is less than the predetermined value Δm, the previous value of the engine operating-point shift ratio α is employed without change, and the present value of the engine operating point is determined based on these engine operating-point shift ratios α (S214). Further, in the very first routine, a previous shift direction does not exist, and so for convenience, at S210 the engine operating-point shift ratio α is shifted by Δα in the positive direction, and at S212 the engine operating-point shift ratio α is shifted by Δα in the negative direction. Accordingly, at S213 investigation is performed as to whether the value of α falls within a range of upper- and lower-limit values. When a value deviates from this range, α is fixed at these upper- and lower-limit values (S213).

The present-value determination operation for this engine operating point will further be described hereinafter. Initially, the initial value of the engine operating point us determined. Additionally, with this embodiment, the initial value of the engine operating point is defined by an initial value To' of an engine torque requirement value T' and No' of an engine speed value requirement value N'. Additionally, the initial value of this engine operating point may be determined and stored at the start of hybrid-engine operation.

More specifically, the initial value (made up of the engine torque requirement value To' and the engine speed value requirement value No') of the engine operating point whereat engine efficiency is highest when generating the engine-power requirement value Pe' determined at S105 is determined from a stored fuel-consumption map.

Further, estimating the engine operating point whereat the overall efficiency of the system becomes high from the engine efficiency and the efficiency of the motors and determining the initial value of the engine operating point also is acceptable.

Next, the engine operating point is be shifted by the engine operating-point shift ratio α from the determined initial value of the engine operating point, and the present value of the engine operating point is determined.

With this embodiment, the engine operating-point shift ratio α is taken to be shifted on the engine torque/engine speed plane with uniform engine-power requirement-value conditions, and so ultimately the present value of the engine operating point is expressed by the equations hereinafter.

Engine torque requirement value T'=α•To'

Engine speed value requirement value N'=(1/α)•No'

Figure 2:
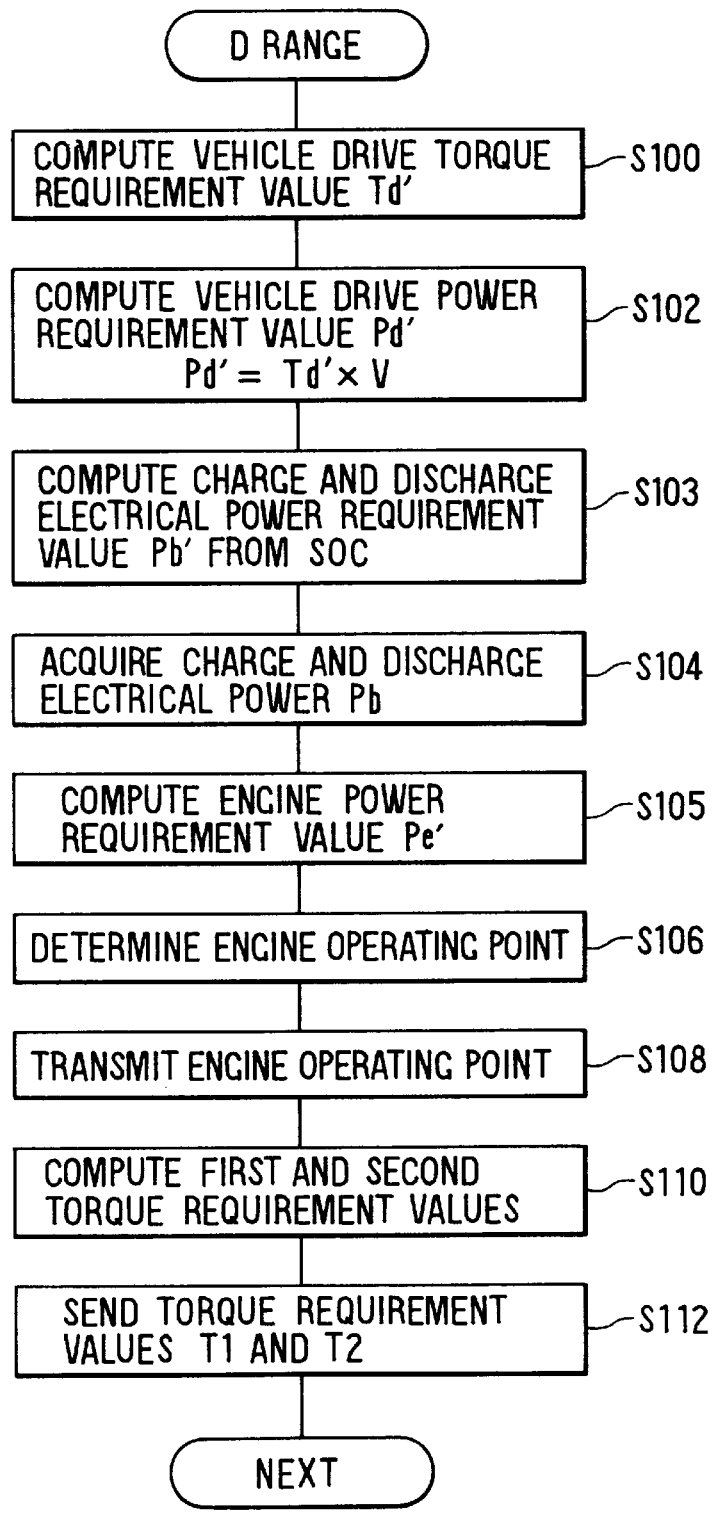
FIG. 2 is a flow diagram depicting control operation of the control apparatus shown in FIG. 1.

Next, returning to the flow diagram of FIG. 2, the determined engine operating point is sent to the internal combustion engine controller 13 (S108), and the internal combustion engine controller 13 determines the intake-air quantity in response to the received engine operating point, and controls the throttle-valve opening degree based on the determined intake-air quantity.

Next, to perform speed control of the first motor 1010 such that engine speed requirement value N'=α•No' Ne is satisfied, a torque requirement value T1 of the first motor 1010 is computed based on the rotation-angle speed differential of the two rotors of the first motor 1010 received from the drive apparatus 14. Further, a torque requirement value T2 of the second motor 1020 is calculated from a differential between the drive-torque requirement value Td' of the vehicle and the torque requirement value T1 of the first motor 1010 (S110), and these torque requirement values T1 and T2 are output to the drive apparatus 14 (S112).

Figure 3:
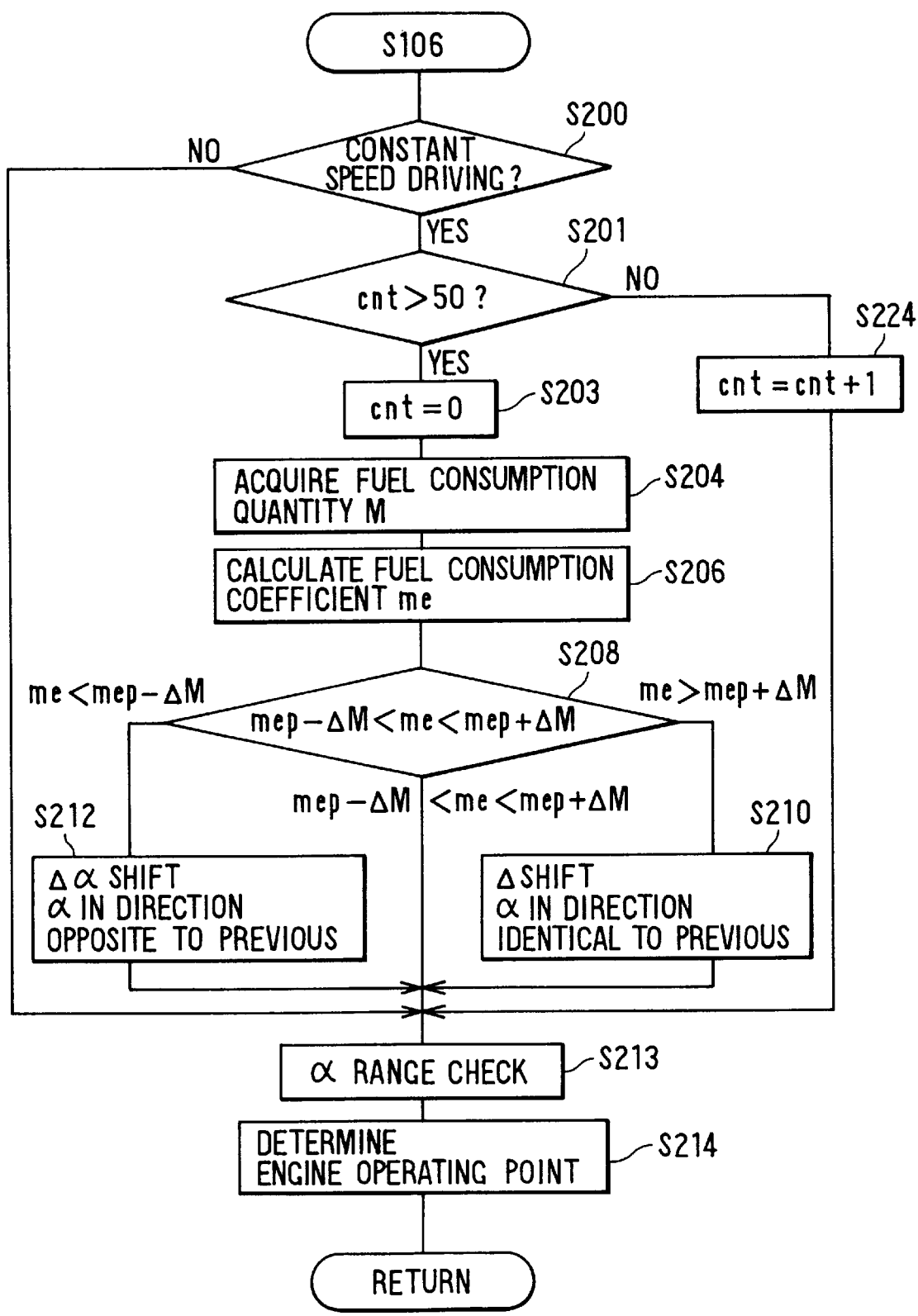
FIG. 3 is a flow diagram depicting the steps of S106 shown in FIG. 2.
Figure 4:
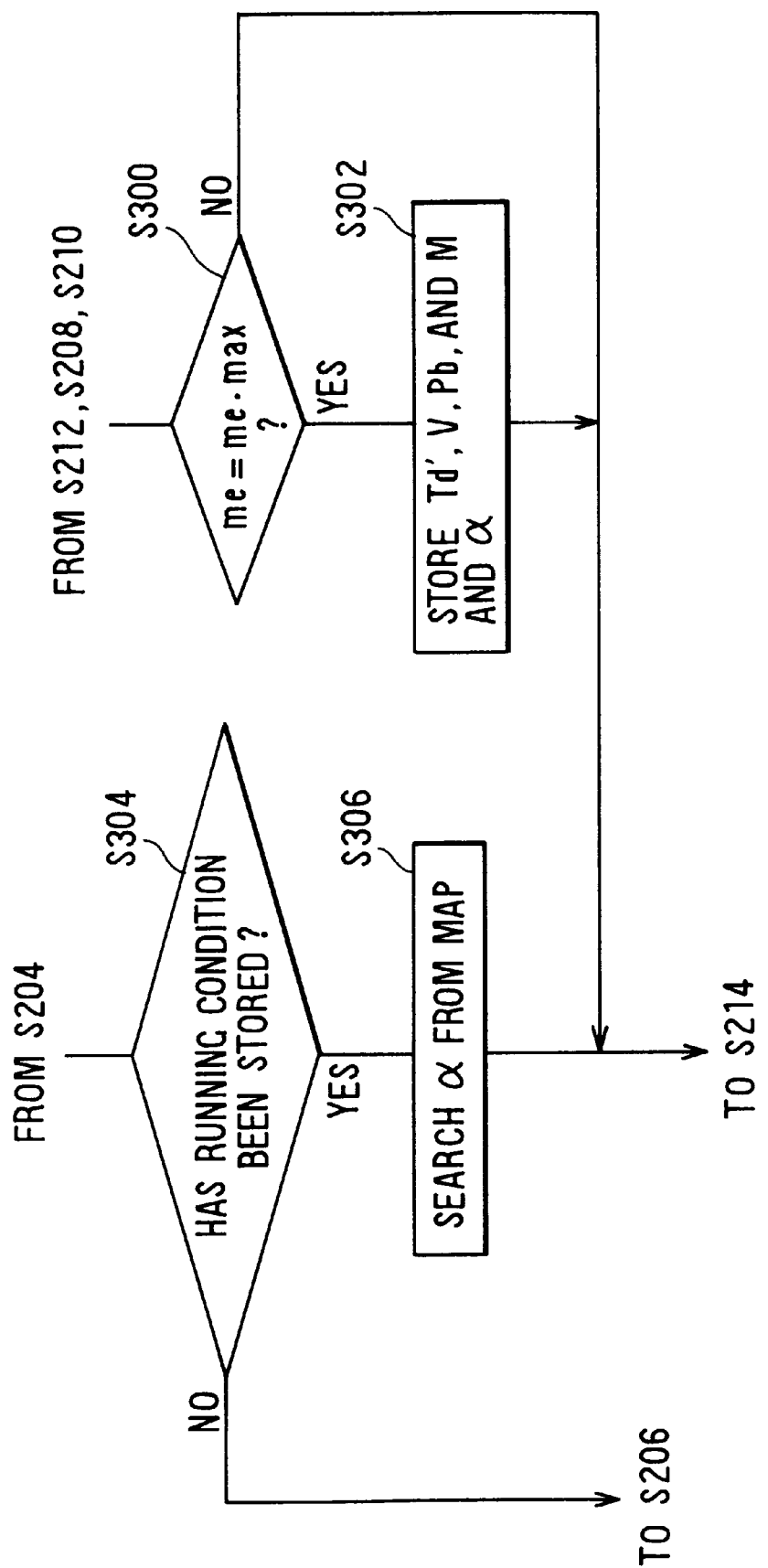
FIG. 4 is a flow diagram depicting control operation of the control apparatus according to a second embodiment.

Another embodiment will be described with reference to the flow diagram indicated in FIG. 4. This flow diagram adds to the control of the first embodiment depicted in FIG. 3; immediately prior to S214, investigation as to whether the fuel-consumption coefficient me is a maximum value memax is performed (S300). When the coefficient is not at the maximum value, execution jumps to S214; when memax is reached, an operating condition at this time (herein, the vehicle drive-torque requirement value Td', the vehicle speed V, the charge and discharge electrical power Pb, the fuel-consumption quantity M and the engine operating-point shift ratio α) are stored to a map (S302).

Meanwhile, immediately subsequently to S204, investigation as to whether the present running condition (the vehicle drive-torque requirement value Td', the vehicle speed V, the charge and discharge electrical power Pb, and the fuel-consumption quantity M) coincides with one of the running conditions taken to have been stored at S302 is performed (S304). When conditions do not coincide, execution jumps to S206. When the conditions do coincide, a corresponding engine operating-point shift ratio α is searched from the above-described map, and execution advances to S214.

Subsequently, the engine operating-point shift ratio α whereat the overall efficiency, that is, the fuel-consumption coefficient me, is maximized can rapidly be selected according to the flow diagram shown in FIG. 3, and so fuel consumption is improved and the associated calculation load can be alleviated.

Further, in this embodiment, the vehicle drive-power requirement value Pd' may of course be employed in substitution for the vehicle drive-torque requirement value Td' and the vehicle speed V as the running condition.

Moreover, the capacity of the memory device cannot be enlarged and across-time change in the characteristics of the hybrid engine cannot be accommodated. However, it is possible also to determine the overall efficiency and determine the shift quantity from a predetermined initial value of the engine operating point in a fixed manner based on a stored map based on an input running condition.

With the above-described embodiment, an absolute value thereof was employed as the engine speed, but a gear ratio as a relative speed with respect to the speed of the output shaft of the motive power transmitter may be employed.

In case of performing engine torque control in correspondence with the engine torque requirement value of the engine operating point that was determined, it is of course possible to add control corresponding to the number of engine cylinders present.

In the case of performing engine torque control in correspondence with the engine torque requirement value of the engine operating point that was determined, it is of course possible to add interval engine operation.

The calculation portion of the above-described embodiment can of course entirely be substituted with extraction of the required numerical values from a map storing a coefficient relationship.

The update quantity Δα of the engine operating-point shift ratio α may be enlarged in the proximity of a shift start-time point and reduced in the proximity of an overall-efficiency maximum point, for example as in simulated in a neural network. When such is done, an efficiency maximum point can be reached without being trapped by localized efficiency.

In calculation of the efficiency η of the hybrid-system, various modified equations may be used, as in η=C•Pd'/(M•(1+Pb/Pe')).

The motors of the hybrid-system are provided with a first motor driven by at least engine torque and a second motor mechanically or electrically joined to the first motor, and output torque to at least a vehicle driveshaft.

The motive power transmitter car, be provided with a planetary reduction-gear mechanism of three-shaft structure. Preferably, the first shaft of the planetary reduction-gear mechanism is joined to the input shaft of the motive power transmitter, the second shaft is joined to the second motor via the first motor, and the third shaft and the shaft of the second motor are connected to the output shaft of the motive power transmitter.

The motive power transmitter can be provided with either a stepless gearbox, a continuous variable transmission, or a multiple-stage automatic transmission wherein the motor is engaged with either the input shaft or the output shaft. Also, the motive power transmitter can be provided with a clutch mechanism to separate the input shaft or the output shaft of the motor from the engine output shaft or the motive-power transmitting mechanism.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A control system for a hybrid electric vehicle comprising:
 a motive power transmitter comprising a motor to convert at least a portion of engine power to electrical power, and for generating at least a portion of vehicle drive power;
 an electricity storage device for transmitting to and receiving from said motor charge and discharge electrical power, respectively;
 an operating point determining device for determining an engine operating point of respective portions of said hybrid system including an engine operating point that maximizes overall efficiency based on overall system efficiency-related information extracted from engine input information, as well as a relationship between said overall-efficiency-related information and said engine operating point; and an operation control device for controlling operation of said hybrid-system based on said determined engine operating point.

2. The control system of claim 1, wherein said engine operating-point determining device calculates said overall-efficiency-related information as a function of efficiency of said engine and efficiency of said motive power transmitter.

3. The control system of claim 1, wherein said operating-point determining device calculates said overall efficiency based on a fuel-consumption quantity of said engine, said charge and discharge electrical power, and a vehicle drive-power requirement value.

4. The control system of claim 3, wherein said operating-point determining device determines said engine operating point so that said overall efficiency is maximized when a total of said vehicle drive-power requirement value, a charge and discharge power requirement value, and loss, coincides with an engine-power requirement value.

5. The control system of claim 1, wherein said operating-point determining device calculates said overall efficiency while shifting said engine operating point by a predetermined amount, and determines said engine operating point so that said overall efficiency is maximized.

6. The control system of claim 1, wherein said operating-point determining device determines a present value of said engine operating point according to shift from a predetermined initial value, and establishes said initial value in a region wherein one of engine efficiency and said overall efficiency is maximized.

7. The control system of claim 1, wherein said operating-point determining device stores a predetermined vehicle operating point, and a previously-determined engine operating point corresponding to said predetermined vehicle operating point, and determines a present engine operating point based on a comparison between said stored predetermined vehicle operating point and a presently-detected vehicle operating point.

8. The control system of claim 1, wherein said operating-point determining device determines said engine operating point solely during a predetermined steady state of operation.

9. The control system of claim 8, wherein said operating-point determining device calculates said overall efficiency while shifting said engine operating point by a predetermined amount, said operating-point determining device shifting said engine operating point from an engine maximum efficiency point so that said overall efficiency is maximized, and performing restriction so that a total shift quantity of said shifted engine operating point does not exceed a predetermined upper-limit value.

10. A hybrid electric vehicle controller comprising:

a device for determining engine operating points of respective engine portions including an engine operating point that maximizes overall efficiency based on overall engine efficiency-related information extracted from engine input information, as well as a relationship between said overall-efficiency-related information and said engine operating point; and an engine operation control device for controlling engine operation based on said determined engine operating points.

11. The controller of claim 10, wherein said device for determining engine operating points calculates said overall efficiency-related information as a function of engine efficiency and motive power device efficiency.

12. The controller of claim 10, wherein said operating-point determining device calculates said overall efficiency based on an engine fuel-consumption quantity, motive power device charge and discharge electrical power, and a vehicle drive-power requirement value.

13. The controller of claim 12, wherein said operating-point determining device determines said engine operating-point so that said overall efficiency is maximized when a total of a vehicle drive-power requirement value, a charge and discharge power requirement value, and loss, coincides with said engine-power requirement value.

14. The controller of claim 10, wherein said operating-point determining device calculates said overall efficiency while shifting said engine operating point by a predetermined amount, and determines said engine operating point so that said overall efficiency is maximized.

15. The controller of claim 10, wherein said operating-point determining device determines a present engine operating-point according to shift from a predetermined initial value, and establishes said present value in a region wherein one of engine efficiency and overall efficiency is maximized.

16. The controller of claim 10, wherein said operating-point determining device stores a predetermined vehicle operating point, and a predetermined engine operating point corresponding to said stored vehicle operating point, and determines said engine operating point based on a comparison of said stored predetermined vehicle operating point and said present vehicle operating point.

17. The controller of claim 10, wherein said operating-point determining device determines said engine operating point solely during a predetermined steady state of operation.

18. The controller of claim 17, wherein said operating-point determining device calculates said overall efficiency while shifting said engine operating point by a predetermined amount, shifts said engine operating point from an engine maximum efficiency point so that said overall efficiency is maximized, and performs restriction so that a total shift quantity of said shifted engine operating point does not exceed a predetermined upper-limit value.

19. A method for controlling a hybrid electric vehicle comprising:

causing at least a portion of engine power to be saved as stored power when said engine power is above a predetermined power level;

causing at least a portion of vehicle drive power to be provided from at least one of power generation and said stored power when said engine power is below a predetermined level;

determining engine operating points including an engine operating point that maximizes overall system efficiency based on overall system efficiency-related information extracted from engine input information, as well as based on a relationship between said overall efficiency-related information and said engine operating point; and controlling operation of said hybrid-system based on said engine operating point.

20. The controller of claim 19, wherein said step of determining engine operating points further comprises maximizing said overall efficiency based on a fuel-consumption quantity of said engine, said steps of causing, and a vehicle drive-power requirement value.

* * * * *